United States Patent [19]

Nishiyama

[11] Patent Number: 4,573,626

[45] Date of Patent: Mar. 4, 1986

[54] APPARATUS FOR ASSEMBLING FRONT UNDER PORTION OF VEHICLE BODY

[75] Inventor: Yosuke Nishiyama, Toyota, Japan

[73] Assignee: Toyota Jidosha Kabushiki Kaisha, Japan

[21] Appl. No.: 539,171

[22] Filed: Oct. 5, 1983

[51] Int. Cl.[4] .......................... B23K 9/12; B23K 37/04
[52] U.S. Cl. ........................................ 228/6.1; 228/47; 219/79; 29/429
[58] Field of Search ............................ 228/4.1, 6 R, 47; 29/429; 219/79, 80

[56] References Cited

U.S. PATENT DOCUMENTS

| 3,288,978 | 11/1966 | Trygar | 219/80 |
| 3,968,558 | 7/1976 | Sekine et al. | 29/429 |
| 4,256,947 | 3/1981 | DeCandia | 219/79 |

Primary Examiner—Kenneth J. Ramsey
Attorney, Agent, or Firm—Parkhurst & Oliff

[57] ABSTRACT

An apparatus for automatically assembling a front fender apron, a radiator support and a dash panel into a front under portion of a vehicle body with the use of transfer machines and automatic welding equipments.

9 Claims, 6 Drawing Figures (I)

APPARATUS FOR ASSEMBLING FRONT UNDER PORTION OF VEHICLE BODY

BACKGROUND OF THE INVENTION

The present invention relates to an apparatus for assemblying a front under portion of a vehicle body, and particularly to an apparatus employing automatic transfer machines and welding robots or automatic welding equipment.

The front under portion of the vehicle body comprises a pair of front fender aprons, a dash panel and a radiator support. Heretofore, all the transfer and locating of such members was not designed to be automatic and had to be done by hand. Since there is manual operation, automatic assembly employing the welding robots is restricted a low for the workers' safety. This results in a low working efficiency.

SUMMARY OF THE INVENTION

The present invention was made in view of the foregoing background and to overcome the foregoing drawbacks. It is accordingly an object of this invention to provide an apparatus for automatically assemblying a front under portion of a vehicle body with the use of automatic transfer machines and welding robots.

With the foregoing and other objects in view, an apparatus and method in accordance with certain features of the invention includes overhead conveyors, swing type transfer machines and automatic welding equipment. One of the overhead conveyors is for transferring the front fender apron to a predetermined position, and a second conveyor is for transferring the dash panel to a waiting position. One of the swing type transfer machines is for transferring a radiator support to a predetermined position, and the other is a machine for transferring the dash panel from the waiting position to a predetermined position. The automatic welding equipment is adapted to weld the front fender apron, the radiator support and the dash panel to form a unitary front under portion of a vehicle body.

BRIEF DESCRIPTION OF THE DRAWINGS

The above objects, features and advantages of the present invention will be more apparent from the following description of the preferred embodiments taken in conjunction with the accompanying drawings, wherein.

DETAILED DESCRIPTION OF THE PREFERRED EMBODIMENTS

Te present invention is described in detail with reference to the accompanying drawings which illustrate different embodiments of the present invention.

Figure 1:
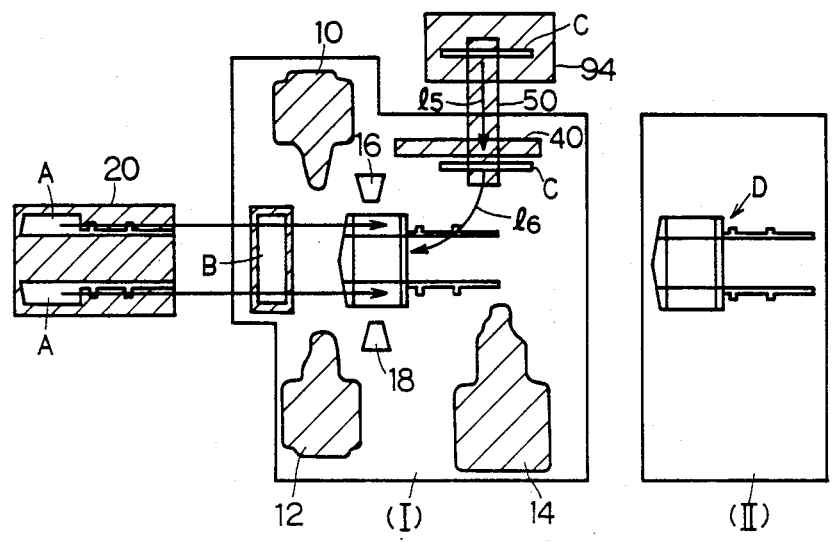
FIG. 1 is a schematic plan view of the apparatus of the present invention.

Referring first to FIG. 1, the apparatus of the present invention is schematically illustrated as viewed from above. The front under portion of the vehicle body comprises a pair of front fender aprons designated by the reference "A", a radiator support designated by the reference "B", and a dash panel designated by the reference "C". A pair of front fender aprons A are transferred through an overhead conveyor 20 to the work station I. At the work station I, the aprons A, the radiator support B and the dash panel C, transferred through an overhead conveyor 50 and a swing type transfer machine 40, are welded by welding robots 10, 12, 14 and automatic welding equipment. The assembled body is transferred next to a work station "II".

Figure 2:
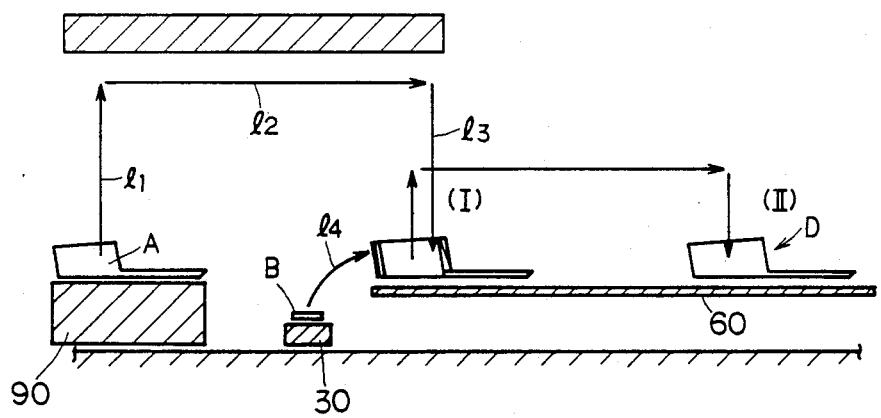
FIG. 2 is a schematic side view of a transfer machine employed in the present invention.

Referring next to FIG. 2, there is schematically shown the side view of the transfer machine employed in the present invention.

Figure 3:
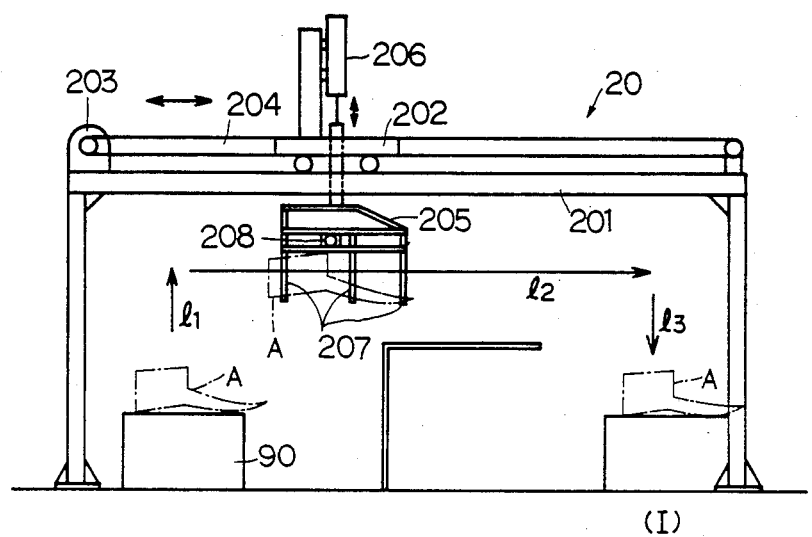
FIG. 3 is a schematic side view of an overhead conveyor employed in the present invention.

The front fender aprons A are moved from a position on a stand 90 to the work station I via the routes $l_1$, $l_2$ and $l_3$ through the overhead conveyor 20, which is illustrated in FIG. 3 in detail. The radiator support B is transferred through the swing type transfer machine 30 via a route $l_4$ to the work station I. The assembled body is transferred from the work station I to the next work station II through a transfer machine 60. The transfer machine may be a conventional bar type or belt type.

Referring next to FIG. 3, there is schematically illustrated the overhead conveyor 20 for transferring the front fender aprons A to the work station I via the routes $l_1$, $l_2$ and $l_3$. A truck 202 is mounted on a guide frame 201 and is designed to be moved in the horizontal direction, parallel to the length of the guide frame, by means of a chain 204 driven by an electric motor 203. A hanger 205 is hung through a cylinder 206. The hanger 205 includes a pair of grippers 207. The grippers 207 are designed to be opened or closed through the cylinder 208 mounted on the hanger 205. Through this operation, the front fender aprons A are gripped by the hanger 205. The front fender aprons A are lifted up from the position on the stand as indicated by $l_1$. Next, the hanger 205 is transferred in the right direction as indicated by $l_2$. At the right position of the guide frame, the hanger 205 is moved downwardly by the operation of the cylinder 206 as indicated by $l_3$. The aprons A are positioned on the station I through the opening movement of the gripper 207.

Figure 4:
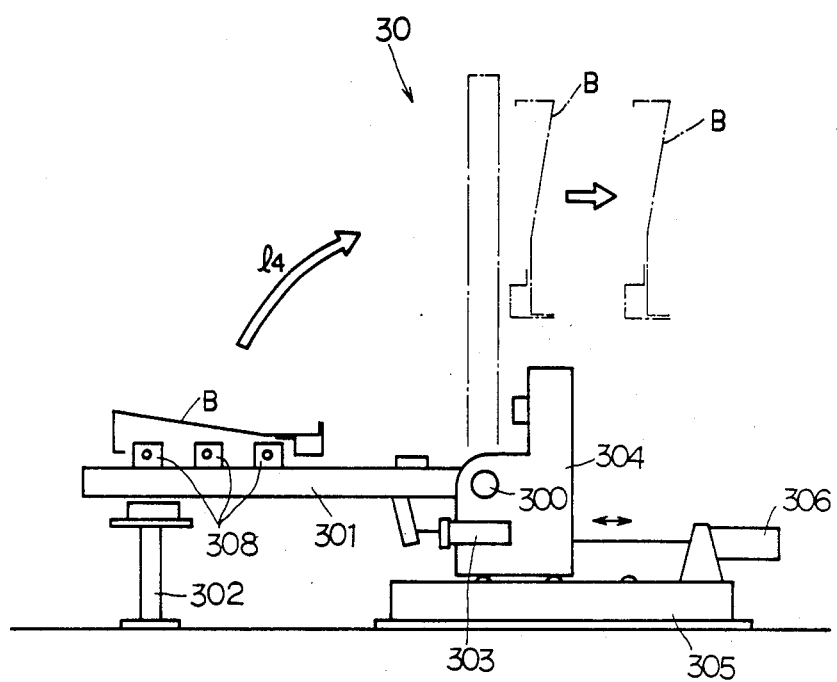
FIG. 4 is a schematic side view of a swing type transfer machine employed in the present invention.

Referring next to FIG. 4, there is illustrated a swing type transfer machine 30 for moving the radiator support B to the work station I. The machine 30 includes a base 305 fixed on the ground, a stand 304 being movable in the horizontal direction through a cylinder 306. A holding plate 301 is mounted on the stand 304 and is adapted to be pivotably rotated in the clockwise direction around a horizontal shaft 300 by cylinder 303 horizontally swingable. The front part of the holding plate 301 is supported by a rest 302. The radiator support B mounted on the holding plate 301 is rotated through the rotational movement of the holding plate 301 from the position indicated by the solid line to the phantom line position.

Figure 5:
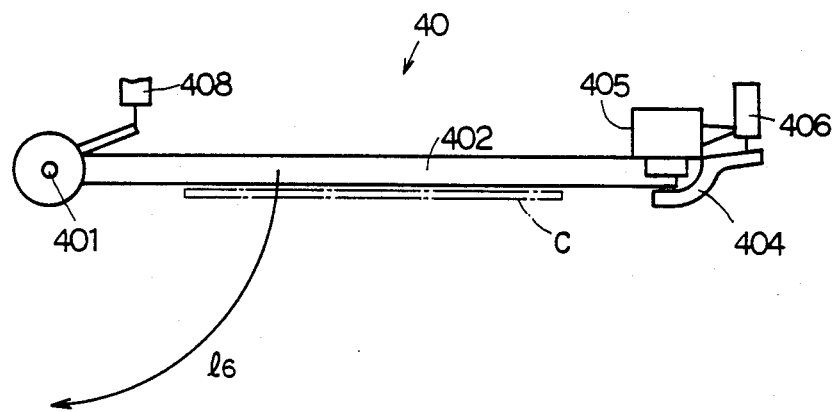
FIG. 5 is a top plan view of a swing type transfer machine for a dash panel employed in the present invention.
Figure 6:
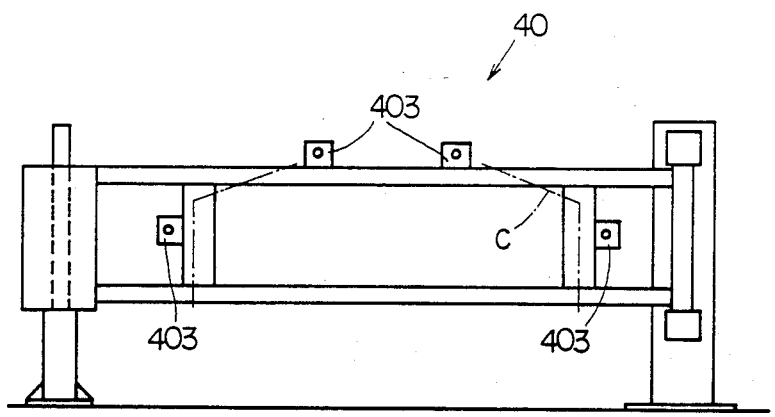
FIG. 6 is a side view of the machine in FIG. 5.

Referring next to FIGS. 5 and 6, there is illustrated a swing type transfer machine 40 for mounting the dash panel C. A plate 402 is adapted to be rotated around a vertical shaft 401 (vertically swingable) between a first position which is perpendicular to a second guide frame of a second overhead tranfer machine (e.g. perpendicular to the length of the guide frame which is the direction along which the truck and components move on the guide frame) and a second position which is perpendicular to the direction of movement of components on the main transfer machine. The plate 402 holds the dash panel C through a cylinder 403. A latch member 404 holds the plate 402 in contact with a stopper 405. Cylinder 406 disengages the latch member 404 and allows the plate 402 to swing.

The structure of an overhead conveyor 50 for moving the dash panel C is the same as that of the conveyor 20.

In operation of the above structure, first the hanger 205 is lowered by the cylinder 206 to position 90 shown in FIG. 3. The cylinder 208 then closes the gripper 207 which grips the front fender apron A. The hanger 205 is then moved upwardly by cylinder 206 as designated by $l_1$. Next, the truck 202 is driven forward by the motor 203 and chain 204 as indicated by $l_2$, and the hanger 205 is lowered as designated by $l_3$. The gripper 207 then opens and positions the front fender apron A on the station I. As shown in FIG. 4, the radiator support B is held on plate 301 by cylinders 308. Cylinder 303 rotates plate 301 around shaft 300 to the phantom line position as indicated by $l_4$. The radiator support B is then moved forward to a predetermined position by cylinder 306.

The dash panel C is carried from holder 94 in FIG. 1 through the overhead conveyor 50 to the position on the plate 402 as shown in FIG. 5. The dash panel C is maintained on plate 402 by cylinder 403. The cylinder 406 opens latch member 404. The plate 402 is then rotated as designated by $l_6$ by cylinder 408 and is transferred to the predetermined position of the station I.

Next, the front under portion of the vehicle body is welded by the welding robots 10, 12, 14 and the automatic welding equipment 16, 18. The assembled body D is transferred to the next station II through the transfer machine 60.

While the present invention has been described in its preferred embodiments, it is to be understood that the invention is not limited thereto, and may be otherwise embodied within the scope of the following claims.

What is claimed is:

1. A system for automatically assembling components of a vehicle body, comprising:
    a first overhead conveyor including a guide frame and a hanger, said first overhead conveyor extending over a first work station and a first end of a main transfer machine, said hanger extending from and being movable along said guide frame, said main transfer machine adapted to transfer said components in substantially the same direction as the direction of movement of said hanger;
    a first swing-type transfer machine including a base member, a first holding plate and a horizontal shaft, said base member of said first swing-type transfer machine being positioned on the ground between said first work station and said first end of said main transfer machine, said horizontal shaft being perpendicular to the direction of movement of the hanger along the guide frame of said first overhead conveyor, said first holding plate being pivotally mounted on the horizontal shaft, first swing-type transfer machine being located under said first overhead conveyor and being adapted to remain under said first overhead conveyor for substantially an entire swing of said swingably mounted plate;
    automatic welding equipment;
    a second swing-type transfer machine having a vertical shaft and a second holding plate, said second holding plate being pivotally mounted on the vertical shaft;
    a second overhead conveyor including a guide frame and a hanger, the guide frame of said second overhead conveyor being perpendicular to the guide frame of said first overhead conveyor, the second overhead conveyor extending over a second work station to said second swing-type transfer machine, the hanger of said second overhead conveyor extending from and being movable along the guide frame of said second overhead conveyor;
    said second holding plate adapted to be swingable between a first position at which it is perpendicular to, and at one end of, said second overhead conveyor and a second swing position at which it is perpendicular to and at a second end of said main transfer machine;
    said first overhead conveyor, said first swing-type transfer machine, and said second swing-type transfer machine adapted to assemble components on the main transfer machine and said automatic welding equipment being adapted to weld said components on said main transfer machine.

2. The system of claim 1, wherein said first overhead conveyor further comprises:
    a truck adapted to be movable on said guide frame;
    said hanger adapted to be mounted on said truck and adapted to be vertically movable;
    a gripper attached to said hanger, the gripper being pivotally rotatable, whereby the gripper is adapted to hold one of said components;
    a cylinder secured to said truck and being adapted to vertically move said hanger; and
    a driving means adapted to drive the truck.

3. The system of claim 1, wherein said second swing type transfer machine comprises:
    the base member adapted to be movable in parallel with the guide frame of said first overhead conveyor; and
    the first holding plate being adapted to hold one of the components thereon.

4. The system of claim 1, wherein said second swing type transfer machine comprises:
    the second holding plate being pivotally rotatable around said vertical shaft and keeping one of the components thereon;
    a latch member adapted to stop the pivotable rotation of the second holding plate; and
    a cylinder adapted to disengage the latch member from the second holding plate.

5. A system for automatically assembling components of a vehicle body comprising:
    a main transfer machine which extends at a first end to a horizontally swingable transfer machine and at a second end to a vertically swingable transfer machine, said vertically swingable transfer machine including a plate;
    a first overhead conveyor which at one end extends substantially completely over said horizontally swingable transfer machine and remains substantially over said horizontally swingable transfer machine throughout an entire swing of said horizontally swingably transfer machine; and
    a second overhead conveyor which extends at a first end to said vertically swingable transfer machine, said vertical swingable transfer machine positioned so that at a first swing position said plate is perpendicular to, and at said first end of, said second overhead conveyor and so that at a second swing position said plate is perpendicular to, and a second end of, said main transfer machine.

6. A method of automatically assembling components of a vehicle, said method comprising:
   transferring a first component with a first overhead conveyor, said first overhead conveyor extending over a first work station and a first swing-type transfer machine and transferring said first component to a main transfer machine;
   transferring a second component with said first swing-type transfer machine, said first swing-type transfer machine including a plate, said plate being pivotable on a horizontal axis, said second component being transferred on said plate to said main transfer machine;
   transferring a third component with a second overhead conveyor, said overhead conveyor transferring said third component to a second swing-type transfer machine, said second swing-type transfer machine including a holding plate which is pivotable about a vertical axis from a first swing position which is perpendicular to said second overhead conveyor to a second swing position which is perpendicular to said main transfer machine, said second swing-type transfer machine transferring said third component to said main transfer machine and mounting said third component on said first component; and
   welding said second and third components while on said main transfer machine.

7. The method of claim 6, wherein the first component is a pair of front fender aprons.

8. The method of claim 6, wherein the second component is a radiator support.

9. The method of claim 6, wherein the third component is a dash panel.

* * * * *